3,253,521
FLEXIBLE PAVING COMPOSITION

Herbert A. Endres, Silver Lake, Ohio, assignor to The Goodyear Tire & Rubber Company, Akron, Ohio, a corporation of Ohio
No Drawing. Filed Mar. 16, 1960, Ser. No. 15,280
4 Claims. (Cl. 94—23)

This invention relates to shaped bituminous non-mineral aggregate compositions composed essentially of ruburized bitumen and an aggregate consisting of particulated rubber, and to a method of using said compositions. More particularly this invention relates to paving blocks composed of rubberized bitumen and a particulated rubber aggregate and to the use thereof.

Although the use of mineral aggregates in bituminous compositions for road paving is very old, these paving compositions are relatively inflexible and have numerous shortcomings. In recent years many attempts have been made to improve these mineral aggregate bituminous compositions by dispersing rubber microscopically in the bitumen. Even though this practice has met with some success, these particular compositions have relatively high specific gravities, i.e., in excess of 2.5 due to the mineral aggregate and, therefore, have certain disadvantages, for example, for use in covering draw bridges.

Therefore a principal object of this invention is to provide a rubberized bituminous non-mineral aggregate paving composition which has considerable load carrying ability, good flexibility and resiliency, and a specific gravity of less than about 1.5.

A further object of this invention is to provide a new use for some of the more than 500,000,000 pounds of scrap rubber, such as tires, which are burned each year.

Still another object of this invention is to provide a rubberized bituminous, non-mineral aggregate composition which may be shaped into paving blocks, be stored, and be used by the application of a suitable adhesive between the surface of the paving block and the surface to which it is applied.

In the practice of this invention particulated rubber is incorporated into a molten rubberized bitumen and the resulting mixture is shaped and cooled under sufficient pressure to maintain the shape of said composition. In general, the rubberized bitumen is first prepared by any of the processes well known to the art, for example, by adding a rubber latex to a molten asphalt under conditions which reduce substantial foaming of the water as it evaporates. If the rubber latex is added to the molten bitumen while it is in a thin film or if it is sprayed into a vigorously agitated body of molten bitumens at an excess of 250° F. the foam problem may be obviated. Normally the latex should be added to the bitumen in sufficient amounts to give at least about 2% of rubber with the preferred amount being from about 5 to 10% by weight of rubber on a bitumen basis.

It has been found that any type of rubber latex is suitable for the production of the rubberized bitumens suitable for the practice of this invention although some are more suited for certain usages than others. Representative examples of these latices are natural rubber; butadiene-styrene; polybutadiene of the cis, trans, or mixed type; butadiene-acrylonitrile; and polyisoprene of the cis, trans, or mixed type. Where the rubber is to be incorporated into the hot bitumen, it is desirable that the latex contain an antioxidant such as phenyl-beta-naphthylamine, mixtures of alkylated phenols, etc. It is preferred that these latices contain about 26 to 28% by weight of rubber. Where the latices are of the butadiene-styrene type the 70/30 copolymer normally has this percentage of rubber. Generally the rubber concentration should not exceed about 60% by weight as it will present handling problems.

Although the rubber latex per se may be used to prepare rubberized asphalt, the industry appears to prefer the use of a free-flowing powdery concentrate of the rubber to mix with the molten bitumen instead of adding the latex on the job. For example, a rubber-mica powder mix is available commercially which contains on a weight basis about 60% mica and 40% of a 30/70 styrene butadiene copolymer. Also there are available free flowing rubberized bituminous powder concentrates which contain anywhere from about 15 to 60% of rubber with the rest being bitumen chosen from those asphalts having a softening point in excess of about 200° F. In the preparation of the powdery rubber-bitumen concentrates, the latex may be mixed with a molten bitumen such as gilsonite or a very short high-softening point petroleum residue in the manner taught in U.S. Patent 2,921,919 to yield a free flowing powder which may be blended with a paving grade asphalt to give a rubberized asphalt having the desired percent rubber.

Bitumens suitable for use in this invention may be boardly classified into asphaltic and coal tar type bitumens. Representative examples of suitable asphaltic type bitumens are those heavy residual bitumens obtained from crude oils by vacuum or steam distillation or by solvent treatment with the normally gaseous hydrocarbons, such as propane, butane, and hexane; and the naturally occurring asphalts, such as Trinidad, etc. Asphaltic type bitumens may have widely different physical properties depending on the ratio of oils, resin and asphaltene present therein. In general, the softening points may vary from those to soft to be determined in the standard ASTM apparatus to those having softening points in excess of about 200° F. The bituminous materials preferred in this invention are those having ASTM penetrations at 77° F. of about 85 to 200. Representative examples of coal tar type bitumens are those obtained as a by-product from coal retorting.

In general, these coal tar type materials may be distinguished from asphaltic type materials in that they contain at least some phenolic substances usually in the amount of about 1 or more percent by weight. These coal tar type bitumens may also have softening points from too soft to determine to at least about 150° F.

Although any particulated rubber may be used in this invention, the vulcanized and dead types such as that obtained as scrap from cured shaped rubber articles during buffing and/or trimming operations such as in tire or mat production, is preferred. The scrap material, for instance mat scrap, is normally ground to give a particulated rubber having a particle size less than about 0.25 of an inch. Thus the particulated rubber may vary in size from about 0.01 to about 0.25. Another convenient and cheap source of particulated rubber is that obtained during the reclaiming of used tires with the scrap from this operation being ground to give a particle size which will pass normally through a 20 mesh U.S. Standard screen but will not pass a 100 mesh screen.

A typical rubber scrap from tire tread buffings has the following composition:

| Screen size: | Passing, percent by weight |
|---|---|
| 4 | 100 |
| 20 | 24 |
| 35 | 10 |
| 60 | 5.6 |
| 80 | 3.6 |

A typical mat scrap ground to ¼" on a Cumberland grinder has the following screen analysis:

| Screen size: | Passing, percent by weight |
|---|---|
| 4 | 100 |
| 6 | 90.6 |
| 14 | 6.0 |
| 30 | 0.4 |

It should be appreciated that the particle size of this ground rubber scrap or other rubber particles used in this invention should have a range such as that indicated in the screenings above. Thus by using a range of particle size, for instance a 50/50 mixture of ground mat scrap and tire buffings, the percent voids in the rubberized bituminous compositions is decreased and the amount of rubberized bitumen required is reduced. Not only is the amount of rubberized bitumen required reduced but it appears the load carrying ability and the stability of the finished composition is materially increased.

Rubberized bitumen suitable for use in this invention will normally be sufficiently fluid at about 300° to 400° F. to permit the particulated rubber to be incorporated therein. The particulated rubber may be incorporated in the fluid rubberized bitumen in any suitable mixer, such as a Banbury or a pug mill. Normally the ratio of rubberized bitumen to particulated rubber is controlled to give the desired load bearing qualities to the bituminous aggregate compositions. In general about 5 to 50 parts of rubberized bitumen is used for each 100 parts of particulated rubber with the preferred range of rubberized bitumen being from about 10 to 15 parts by weight. Also, where the particulated rubber is very active or lively, it is preferred to use a higher ratio of rubberized bitumen containing a high percentage of microscopically dispersed unvulcanized rubber which exhibits a network structure.

While the rubberized bitumen particulated rubber composition is still warm and plastic, it is shaped to give the desired thickness of surface covering and then cooled to retain this shape. This composition may be shaped in a pressure-type cavity mold to give a block suitable for paving a load bearing surface such as a warehouse floor, streets, driveways, bridges, roads, etc. On the other hand this composition may be shaped into sheets, for instance, on suitable calender rolls, be cooled, and then be cut to the desired size by means of a knife or other suitable cutting means.

These sheets or blocks may be applied to the surface to be covered, preferably by (1) preparing the surface as by cleaning away the dirt, grease, and other contamination from said surfaces; (2) applying an adhesive to the prepared surface and then (3) adhering said sheets or blocks to this surface. Where the surface is asphaltic, concrete, or metallic in nature, the surface may be washed with a high flash naphtha and then the adhesive is applied to the surface. The preferred adhesive is a rubberized asphalt of about 85/100 penetration containing from 2 to 5% by weight of microscopically dispersed rubber. This rubberized asphalt adhesive may be applied to the surface as either a cut-back or as a hot fluid by mopping, troweling, or otherwise. A preheat treatment of the rubberized asphalt adhesive with an open flame prior to placing the sheets or blocks on the surface has been found to be particularly desirable, and surfaces so treated have exhibited excellent adhesion. For instance, one area in a rubber factory covered with blocks of this material have exhibited excellent adhesion in an area where loaded fork trucks come off an elevator and make a right angle turn to go down an aisle. The blocks in this area are subjected to very severe service but they show no sign of slippage on the floor and remarkable resistance to wear in view of repeated compression and expansion of the particulated rubber aggregate in these blocks.

The rubberized bituminous particulated rubber composition of this invention may also be used in the conventional manner. For example, the fluid composition may be applied to a surface preferably which contains a rubberized bitumen adhesive, then this composition before it sets on the surface is rolled or otherwise leveled under sufficient pressure to give the desired thickness at least about 0.25 inch. The rolled or leveled surface composition is then allowed to cool for several hours before vehicles are allowed to use it.

The following definite examples are given to show the preparation of compositions of the present character although the invention is not to be limited to the particular compositions in the present invention as described in this specification and claims. All parts are by weight unless otherwise stated, and penetrations are one hundredths of a centimeter per 5 seconds at 77° F. as determined by the ASTM method, D5–52.

*Example 1.—Preparation and installation of "flex-mat" blocks*

A rubberized asphalt was prepared first by incorporating 125 parts of a powdery rubber-mica mix in 1000 parts of a 85/100 penetration asphalt. The powdery mix was sifted into the molten asphalt at 300 to 325° F. and then slowly incorporated into the asphalt by means of a mechanical stirrer. This particular powdery mix is one available commercially as a composition containing on a weight basis 40% of a 30/70 styrene-butadiene copolymer and 60% powdered mica. A portion of this rubberized asphalt (120 parts) was then uniformly mixed at 300 to 325° F. with 880 parts of ground rubber scrap in a mixing kettle. The ground rubber scrap used for this test was obtained by grinding automobile flooring mat scrap on a Cumberland grinder to obtain ground material having particle sizes less than ¼". This composition was then cast into molds 12" x 12" x ½" and cured in a conventional ruber press at 315° F. for 10 minutes. Then the mold was chilled to about 75° F. while maintaining the rubber composition under a pressure of about 50 to 200 lbs. per square inch to set or solidify the bitumen. After about 15 minutes the molded composition was removed from the press and the resulting blocks were stored at room temperature. Other blocks stored at 130° F. under several pounds of pressure were free from any tendency to stick or block together.

Sufficient blocks were made by the above method to resurface a concrete driveway leading to a loading dock and a company parking lot. The surface of the concrete drive was cleaned with kerosene and then an adhesive coating was applied to the concrete surface with a serrated flooring trowel. The adhesive composition used was a rubbery asphalt containing 3% of rubber and 97% of 85/100 penetration asphalt on a weight basis. This material was heated to about 350° F. prior to being applied to the concrete surface. Then just prior to the laying of the blocks, the adhesive was warmed with a kerosene torch to cause the rubberized asphalt to flow on the concrete surface and thus assure a good bond between the blocks and the concrete surface. Then the blocks were laid on the prepared surface in the manner customarily used for laying flooring tile.

After almost a year of use, which has included part of one winter, these blocks show a relatively small amount of wear, considerably less than that exhibited by control blocks which contain no rubberized asphalt, and at the present rate of wear, these blocks will outlast the control asphalt blocks by several years. These blocks had a specific gravity of 1.4.

*Example 2*

Example 1 was repeated except a coal tar product was used in the preparation of the blocks. The blocks made using coal tar were also applied to another section of the driveway mentioned in Example 1. Test results indicate the blocks of Example 1 to be slightly better than these coal tar blocks. The specific gravity of these blocks was 1.374. Blocks prepared using butadiene-acrylonitrile rubber scrap with a rubberized coal tar binder is thought to be superior to the ones prepared with butadiene-styrene rubber scrap.

*Example 3*

Instead of the powdery rubber mica mix used in Example 1, a free flowing powdery rubber hard asphalt concentrate was used. This concentrate was made by spraying a natural rubber latex into molten asphalt of about 200–220° F. softening point at about 350° F. to give a concentrate containing 30% rubber. Using the procedures of Example 1, 200 parts of this rubber hard asphalt concentrate was mixed with 800 parts of a 130 ASTM penetration propane asphalt; then this rubberized asphalt was mixed in a bakery mixer with 4000 parts of tire buffings. This hot mix was then formed into blocks in a press-mold. The specific gravity of these blocks was less than that of the blocks made in Example 1.

While certain representative embodiments and details have been shown for the purpose of illustrating the invention, it will be apparent to those skilled in this art that various changes and modifications may be made therein without departing from the spirit or scope of the invention.

What is claimed is:

1. In a process for surfacing a vehicular load carrying and related surface, the improvement comprising the steps of (a) preparing said surface, (b) applying a rubberized bituminous adhesive to said surface, and (c) then applying a cover of a paving composition to the surface while the adhesive is in a condition to adhere said composition to the surface, said paving composition comprising a mixture consisting of rubberized bitumen and particulated rubber, said rubberized bitumen consisting of at least about 2% and no more than about 10% by weight of microscopically dispersed rubber in said bitumen and said particulated rubber comprising a ground rubber stock having a particle size less than 0.25 inch, intricacies between the particulated rubber being filled with the rubberized bitumen.

2. In the process of claim 1 wherein the paving composition contains at least 5 parts and no more than 50 parts of rubberized bitumen for each 100 parts of particulated rubber.

3. A bituminous non-mineral aggregate paving composition composed essentially of a rubberized bitumen and an aggregate consisting of particulated vulcanized rubber having discrete particles in the range of about .01 to .25 inch, said rubberized bitumen comprising a mixture of bitumen with 2 to 10% by weight of microscopically dispersed unvulcanized rubber, the intricacies between the particulated rubber being filled with the rubberized bitumen, said composition containing at least 5 parts and no more than about 50 parts of rubberized bitumen for each hundred parts of vulcanized particulated rubber.

4. A process for producing a paving composition comprising (a) incorporating particulated vulcanized ruber into molten rubberized bitumen with the amount of rubberized bitumen being at least about 5 parts to about 50 parts for each hundred parts of particulated vulcanized rubber, (b) shaping the resulting paving composition while warm, and (c) cooling the shaped mixture under sufficient pressure to maintain its shape.

References Cited by the Examiner

UNITED STATES PATENTS

| | | | |
|---|---|---|---|
| 2,347,233 | 4/1944 | Abernathy | 117—26 |
| 2,686,166 | 8/1954 | Taylor | 260—28.5 |
| 2,700,655 | 1/1955 | Endres et al. | 94—20 |
| 2,853,742 | 9/1958 | Dasher | 260—28.5 |
| 2,863,841 | 12/1958 | Bernier | 260—28.5 |
| 2,871,774 | 2/1959 | Johnson | 94—23 |
| 2,921,919 | 1/1960 | Endres et al. | 260—28.5 |
| 2,977,864 | 4/1961 | Pullar | 94—7 |

FOREIGN PATENTS

| | | |
|---|---|---|
| 338,247 | 1930 | Great Britain. |
| 366,559 | 1932 | Great Britain. |
| 410,563 | 1934 | Great Britain. |
| 763,395 | 1956 | Great Britain. |

OTHER REFERENCES

Rubber Roads, by Henry K. Fisher, published by the Natural Rubber Bureau, March 1951, pages 1–37 inclusive.

CHARLES E. O'CONNELL, *Primary Examiner.*

JACOB L. NACKENOFF, WILLIAM I. MUSHAKE, *Examiners.*

J. E. MURTAGH, *Assistant Examiner.*

Dedication 3,253,521.—*Herbert A. Endres*, Silver Lake, Ohio. FLEXIBLE PAVING COMPOSITION. Patent dated May 31, 1966. Dedication filed Jan. 17, 1969, by the assignee, *The Goodyear Tire & Rubber Company*.

Hereby dedicates to the people of the United States the entire term of said patent.

*[Official Gazette June 10, 1969.]*